United States Patent [19]

Zerbian et al.

[11] Patent Number: 5,214,559
[45] Date of Patent: May 25, 1993

[54] MONITORING DEVICE WITH A SWITCHING MECHANISM

[75] Inventors: Erich Zerbian, Fensterbach; Paul Froehlich, Sulzbach-Rosenberg; Siegfried Neumann, Kuemmersbruck; Richard Freitag, Hahnbach; Hans-Joachim Jaehne, Amberg, all of Fed. Rep. of Germany

[73] Assignee: Siemens Aktiengesellschaft, Berlin and Munich, Fed. Rep. of Germany

[21] Appl. No.: 503,531

[22] Filed: Apr. 2, 1990

[30] Foreign Application Priority Data

Apr. 3, 1989 [DE] Fed. Rep. of Germany ....... 3910718

[51] Int. Cl.$^5$ .............................................. H02H 7/08
[52] U.S. Cl. ..................................... 361/93; 318/490; 361/23; 364/483
[58] Field of Search ..................... 361/23, 24, 87, 93; 364/483, 492, 551.01, 551.02, 554; 340/648, 679; 318/490

[56] References Cited

U.S. PATENT DOCUMENTS

| | | | |
|---|---|---|---|
| 4,319,298 | 3/1982 | Davis et al. | 361/24 |
| 4,331,997 | 5/1982 | Engel et al. | 361/93 |
| 4,351,012 | 9/1982 | Elms et al. | 361/96 |
| 4,423,458 | 12/1983 | Stich | 361/93 |
| 4,423,459 | 12/1983 | Stich et al. | 361/94 |
| 4,446,498 | 5/1984 | Stich | 361/87 |
| 4,470,092 | 9/1984 | Lombardi | 361/23 |
| 4,623,967 | 11/1986 | Naimer | 364/483 |
| 4,827,369 | 5/1989 | Saletta et al. | 361/93 X |
| 4,839,830 | 6/1989 | Amey et al. | 364/551.01 |

FOREIGN PATENT DOCUMENTS 3114548 2/1982 Fed. Rep. of Germany .
3122109 1/1983 Fed. Rep. of Germany .
3311240 10/1983 Fed. Rep. of Germany .

OTHER PUBLICATIONS

IEEE Transactions on Power Apparatus and Systems, vol. PAS-99, No. 1, Jan./Feb. 1980, pp. 152-157: Digital Programmable Time-Parameter Relay Offers Versatility and Accuracy, by E. O. Schweitzer.
IEEE Transactions on Power Apparatus and Systems, vol. PAS-99, No. 1 Jan/Feb. 1980, pp. 344-351: Application of Microprocessors to the Control and Protection System at Substation, by Tanaka et al.
Electrotechnik, 1987, #6, pp. 36 & 39.
EC&M, Sep. 1987, pp. 68-73: Total Motor Protection by Arthur Freund et al.

*Primary Examiner*—A. D. Pellinen
*Assistant Examiner*—David Osborn
*Attorney, Agent, or Firm*—Kenyon & Kenyon

[57] ABSTRACT

A monitoring device having a switching mechanism to open or close electric circuits in case of overload which operates as a function of a current-detecting device includes a processor and setpoint memories for comparing and evaluating actual values. A device for detecting additional load operational errors, statistical operating data, and maintenance instructions from at least the load current over the lifetime of the device and providing a run display to display this data are consecutively integrated into the monitoring device. Furthermore, input keys are provided for setting desired parameters, which can be displayed in the run display.

17 Claims, 15 Drawing Sheets

| BYTE 1 | BYTE 2 | BYTE 3 | BYTE 4 | BYTE 5 | BYTE 6 | BLOCK | CHECK SUM |

MONITORING DEVICE WITH A SWITCHING MECHANISM

BACKGROUND OF THE INVENTION

This invention relates to a monitoring device having a switching mechanism to open or close electric circuits in case of overload, wherein the switching mechanism operates as a function of a current-detecting device, which monitoring device also includes a processor and setpoint memories for comparing and evaluating actual values and tripping state indicating devices.

In a known monitoring device as described in German Pat. No. DE-OS 33 11 240, devices are present which take into account a thermal image during the formation of threshold values. That is, the evaluation of the threshold values is influenced by a settable counter reading as a function of the tripping class. Several threshold values can be taken into account by means of a selector switch. A light-emitting diode is provided which indicates the circuit state.

There is a need for a monitoring device having a simple design that is capable of being used in a versatile manner with the greatest possible ease.

SUMMARY OF THE INVENTION

This and other needs are satisfied by the monitoring device of the present invention. The monitoring device comprises a device for detecting additional operational errors, statistical operational data as well as maintenance instructions, and a run display to display this data. In this manner, current data (e.g. for a motor branch circuit) is available at any time and can be checked consecutively in a display without requiring additional sensors over additional cable connectors or additional input blocks.

In order to adapt the monitoring device to individual requirements in a simple manner, input keys are present in the monitoring device to input desired parameters which can be displayed on the run display. In this case, the data can be stored in the memory, making possible the installation of the monitoring device.

In order to avoid damage in case of improper installations, a device is integrated into the monitoring device to block the enabling of the switching mechanism in case of an impermissible assignment of maximum load capacity of the current transformer, contactor size, rated current and tripping class. Since the tripping current for the protective device varies with regard to explosion-proof motors as opposed to standard motors, the blocking device is additionally dependent on setpoint selections for explosion protection.

Because the overcurrent can reach impermissably high values, which can lie in the short circuit current range, the contactor, which was dimensioned for standard current, would suffer possible damage in case of power shutoff. To this end, a device is integrated into the monitoring device to block and to open the electric circuit by means of a contactor and to release the switching operation to the primary circuit breaker.

In order to perform arbitrary, standard control operations with one device, a device is present in the monitoring device to assign various output operations for the respective setpoint selection. The respective desired output operation is specified in the processor as a setpoint. These types of output operations include the following: instant startups, reverse startups, star-delta startups, Dahlander startups, pole reversals, valve actuations, shift operations, soft startups and the actuation of latched switching devices. Presently, a cable needs to be pulled from one location to the other for each individual signal in order to obtain current information on the status of a low-voltage switching device at another location. This causes a high error probability. In order to prevent this, among other things, one or more serially operating interfaces are integrated into the monitoring device for two-way data transmission between two separate units.

In order to change operation parameters, even externally (e.g. by way of a connected PC) the units are locally separated. In order to achieve a rapid processing of the problems at hand, the units comprise separate processors. The setting of operation parameters in the monitoring device is specified by the primary processor in order to ensure that, the setting of operation parameters in the monitoring device is not changed without the knowledge of the primary processor, the release of the input key operation occurs as a function of the interface terminal for the locally separated units.

In order to process a specified menu in a simple and reliable manner, the input keys comprise one enable key, two shift keys and one feedback key according to a default menu. Accidentally touching a key will not change the set parameters, and a clear, step-by-step installation of the monitoring device can be performed. The interface for the locally separated units is operationally coupled to the input keys which allows input from the primary processor in a simple manner. In order to dispense with the individual wiring of local actuating elements, a separate operator control block can be coupled to the monitoring device via plug-in connection. The operator control block can then be mounted at an arbitrary position. When the operator control block has LEDs to indicate the operational status, a rough data signal on the status at this location is also possible.

In order to make the adaptation of the output operation to the respective setpoint assignment discernable at the operator control block in a simple manner, the operator control block has control keys which are assigned to the output operations according to interchangeable labels. In order to incorporate external protective devices such as end switches, etc., into the operation of the monitoring device, an enable input is provided for the monitoring device as an operational error detector. In order to be able to react quickly to individual data signals, transmitted and received data of the two-way data transmission are arranged into several data blocks. Also, to react quickly to individual signals the transmission sequence of the individual data blocks takes place according to the required chronological priority.

In order to construct the transmission in a full duplex manner, the data transmission control takes place via the base processor, and the base processor emits a byte clock pulse and a block clock pulse to the additional processor.

DETAILED DESCRIPTION

Figures 1, 1A:
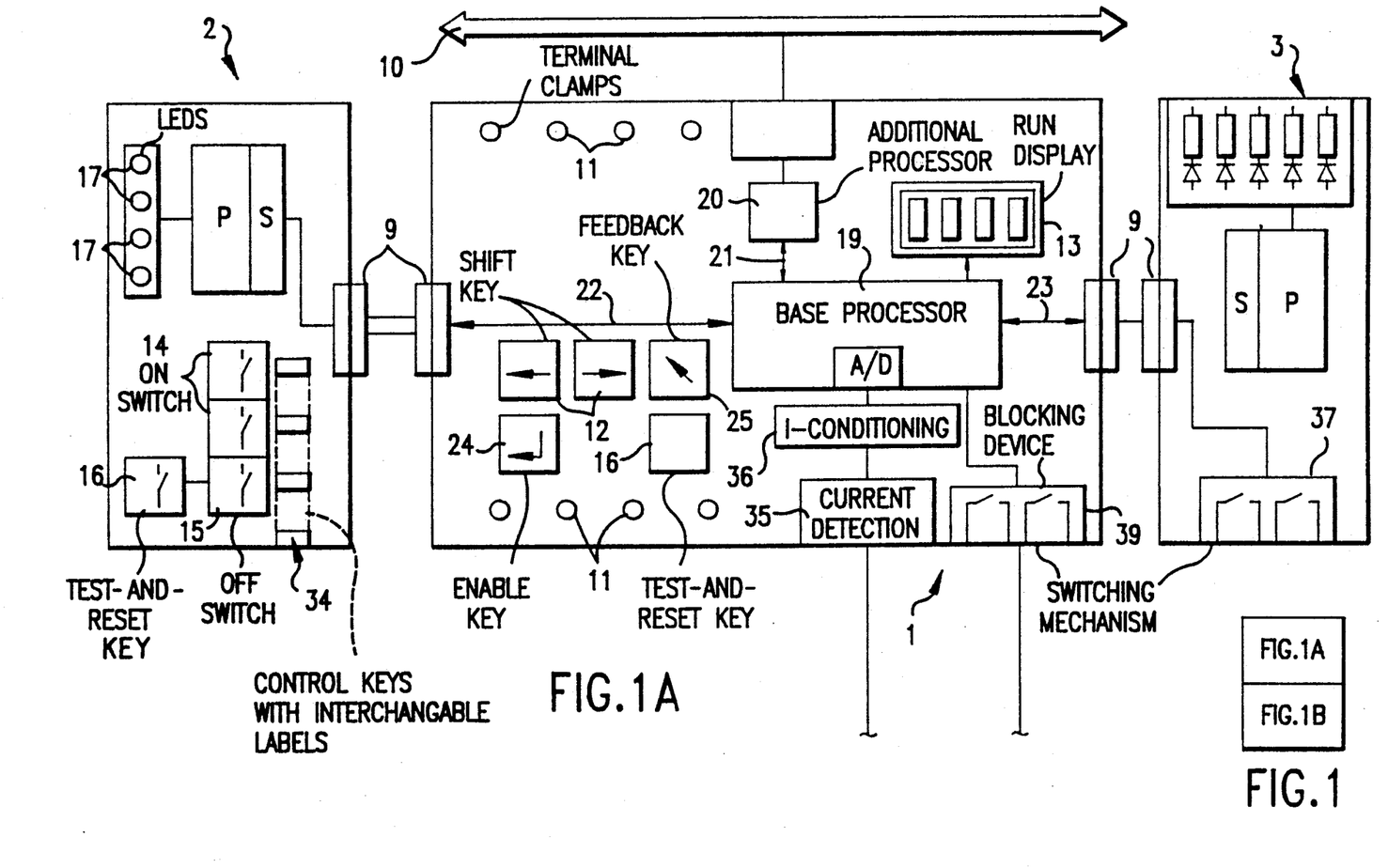
FIGS. 1 and 1A-1B is a block diagram of the monitoring device constructed according to the present invention.
Figure 1B:
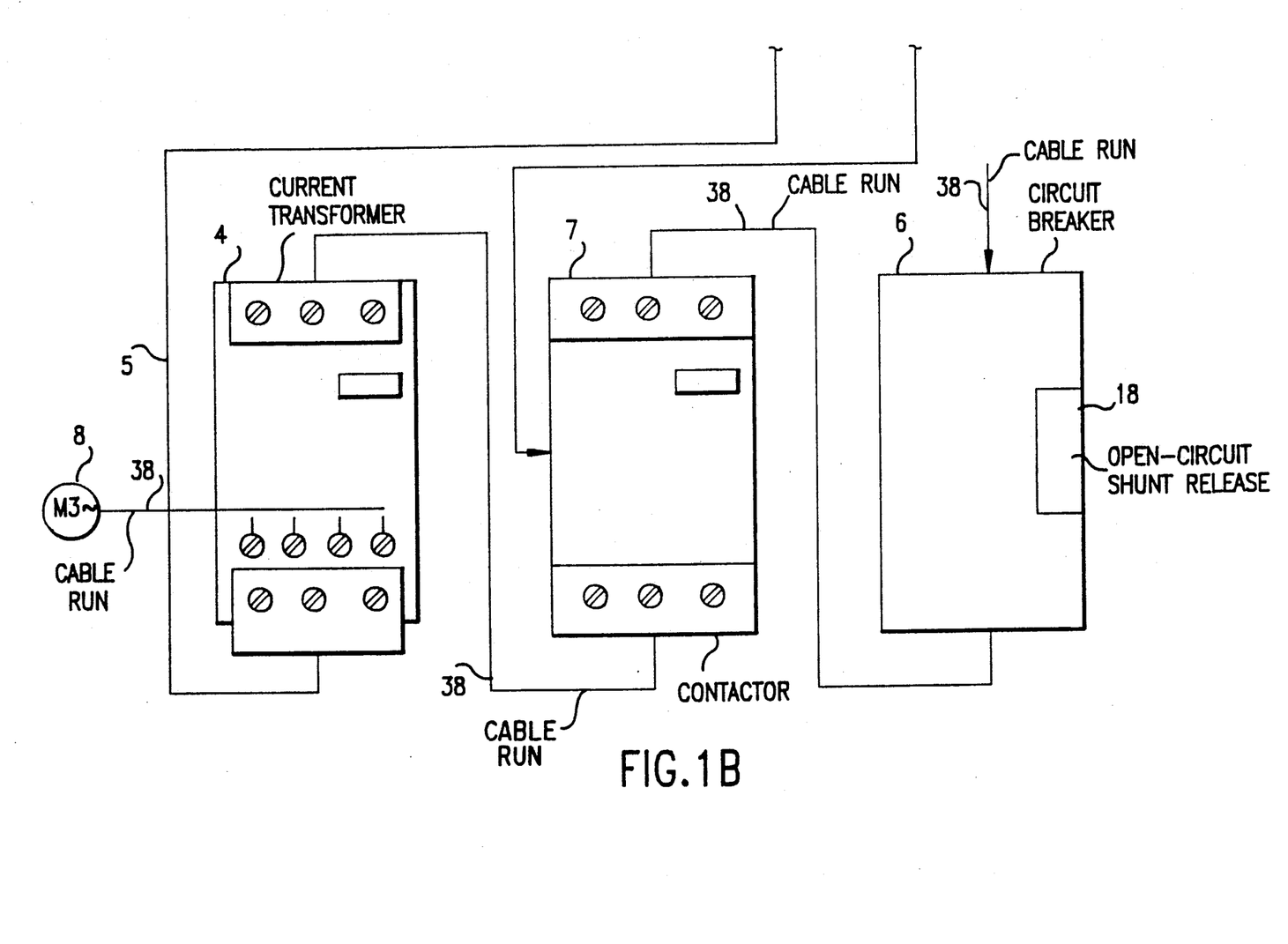

Referring to FIGS. 1A-1B, a layout of which is shown by FIG. 1, the monitoring device of the present invention is shown. The monitoring device comprises the base block 1, the operator control block 2, and possible extension blocks 3. The extension blocks 3 can only be operated together with base blocks 1. The extension blocks 3 chiefly include the hardware for adapting signals from the local control system and the process parameters as well as the output relay for controlling the contactors. A current transformers 4 detect to a motor 8 current via a current detecting lead 5, which runs to the base block 1. The current transformers 4 are coupled in the cable run 38 extending through circuit-breaker 6, contactor 7 and motor 8. Both the extension blocks 3 and the operator control block 2 are coupled to each other through multiway connectors 9 and a multiwire circuit line to prevent mistakes. A switching mechanism 37 is located in the extension block 3 and the base block 1 to block and open the electrical connection between these two blocks and to release the switching operation to the primary circuit breaker 6. A communications bus 10 is coupled to the terminal clamps 11 of the base block 1. The base block 1 further includes two shift keys 12, one enable key 24, one feedback key 25 for input the parameters, and a run display 13 to display the inputted values. The operator control block 2 has LED's 17 as well as an ON switch 14, OFF switch 15, and a test-and-reset key 16, and control keys 34 which are assigned to output operations (described below) according to interchangeable labels.

Devices are assigned to the base block 1 to detect additional operational errors which are detected from the measured load current. These errors include limiting current value overshoot or undershoot in a motor winding, excessive actuating time, or excessive interlock time outs. However, inherent reach errors, CPU failure due to hardware or software errors as well as the failure of the communications bus or the supply voltage can also be measured. Furthermore, warnings about possible pending errors, an overload warning or an asymmetry warning can be made. In this case, the readouts can appear at the display 13 or the LED's 17 in the operator control block 2. However, the readouts can also be transferred over the bus 10 to an arbitrary location, such as the control center. With all error messages, a group alarm display can be provided in parallel to the specific display. The error messages remain intact even after the cancellation of the error source. Only actuating the reset key 16 will erase the error message. To detect the limiting values, the effective current value is calculated by means of the current which is measured by the current sensors 35 and conditioned by a current conditioning device 36, with due consideration of the transmission ratio of the current transformer. The motor overtemperature is then determined as a function of the effective current over time. The motor temperature can then be displayed as a percentage as a relative value of the actual value to setpoint ratio. An asymmetry can be measured and displayed in a similar manner. To detect the statistical operational data, the number of motor startups and the startup availability, can be counted. It is also possible to count the time of the releases through overloads and to display or evaluate the total. The current which last flowed during a release operation can be stored and displayed at a later time.

Periodic servicing causes downtime and other costs. To avoid periodic servicing, such as, check-testing the contactors for sufficient contact material, maintenance hints can be discovered. For example, the $K \times AC3$-current of the contactor 7 flows when the contactor 7 is switched off. The factor "K" is derived from flowing breaking current $K = AC3$-current.

Figure 2:
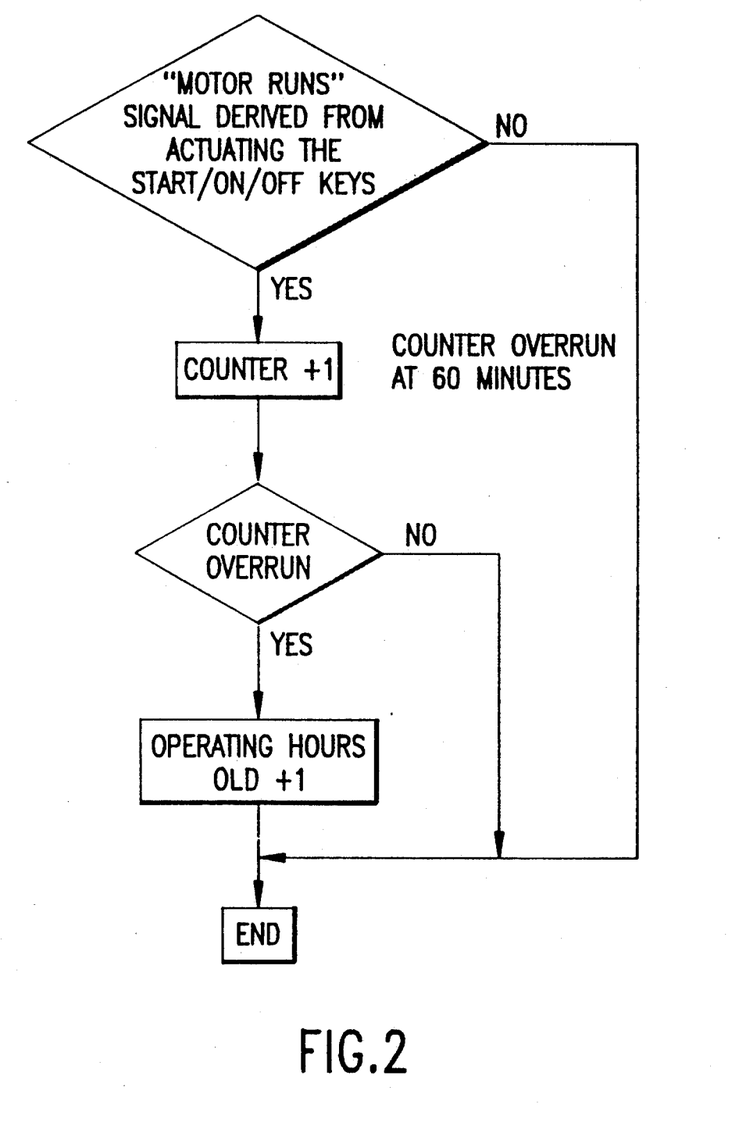
FIG. 2 is a flow chart depicting the operation for detecting the operating hours.

A weighting factor is assigned to the various values of K according to a setpoint table which is stored in read only memory (ROM). The weighting factors are totaled for all switching operations and are referenced to a maximum value. The user can display this reference value as a value for the lifetime of the contactor 7. The motor operating hours can be detected according to the following method. The command "motor run" and one cycle time of the microcontroller (e.g. 10 Hz), is introduced through an AND-gate. The sum of "cycle" and "motor run" is read into a counter, whereby the display of full operating hours can be found in a manner similar to the flow chart of FIG. 2.

In order to avoid incorrectly specifying the contactor, current transformer and tripping class, the following data are stored in the ROM of the base block 1:

First the type and AC3-current value of the motor contactors is stored in the ROM of the base block 1. The AC3 current is defined in DIN 57660, part 102.

The type and operating range of the current transformer are also stored in the ROM. The operating range of the current transformer is defined as the lowest rated transformer current to the highest rated transformer current, where a reliable operating mode of the current transformer is ensured.

Also stored in the ROM is the data shown in Table 1. The current load is to be derived from this table by diving the rated motor current by the AC3-current times 100 in reference to the tripping class. The tripping class is computed from the ratio of tripping current to rated current and the maximum relative tripping time. The relative tripping time is greater than or equal to the difference of tE and time multiplied by the ratio of the tripping current to the rated current and divided by 6.

TABLE 1

| Current Load $x = \dfrac{\text{I-N Motor}}{\text{AC3-current}} \times 100$ | Tripping Classification | IA/IN | Max. Rel. tripping time(sec.) |
| --- | --- | --- | --- |
| x > 95 | 5,10 | 2-10 | 10 |
| 95 > x > 90 | 5,10 | 2-10 | 11 |
| 90 > x > 85 | 5,10 | 2-10 | 12 |
| 85 > x > 80 | 5,10 | 2-10 | 13 |
| 80 > x > 75 | 5,10,15 | 2-10 | 15 |
| 75 > x > 70 | 5,10,15 | 2-10 | 18 |
| 70 > x > 65 | 5,10,15,20 | 2-10 | 20 |
| 65 > x > 60 | 5,10,15,20 | 2-10 | 24 |
| 60 > x > 55 | 5,10,15,20,25,30 | 2-10 | 30 |
| 55 > x > 50 | 5,10,15,20,25,30 | 2-10 | 40 |
| 50 > x > 45 | 5,10,15,20,25,30 | 2-10 | 60 |

TABLE 1-continued

| $x = \dfrac{\text{Current Load}}{\text{AC3-current}} \times 100$ | Tripping Classification | IA/IN | Max. Rel. tripping time(sec.) |
|---|---|---|---|
| x > 45 | 5,10,15,20,25,30 | 2-10 | 100 |

$$tE - \text{time} < \dfrac{\text{max. rel. tripping classification} \times 6}{IA/IN}$$

Figures 3, 3A:
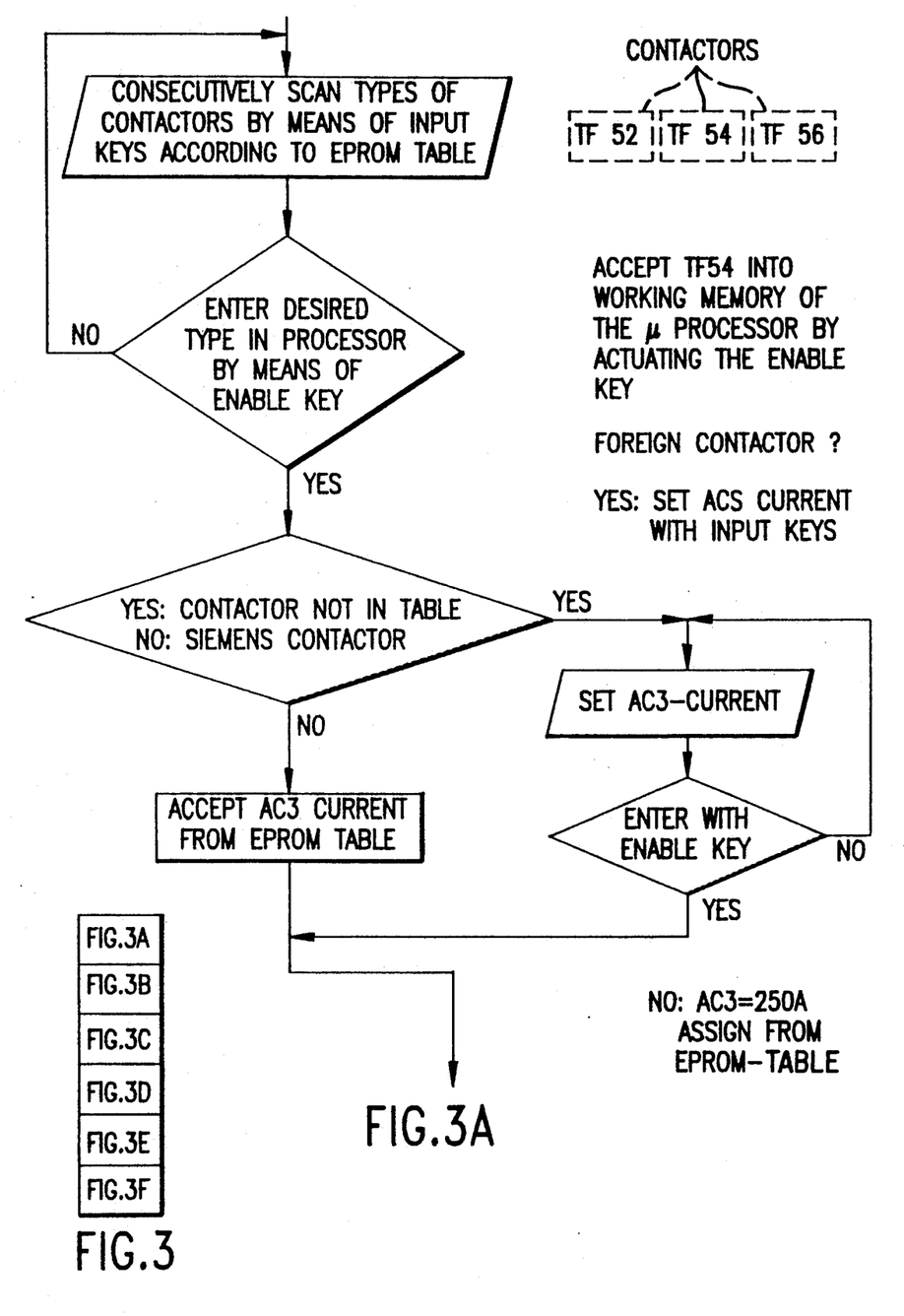
FIGS. 3 and 3A-3F is a flow chart depicting the operation for intelligently coordinating contactors, current transformers, the rated current and the tripping class.
Figure 3B:
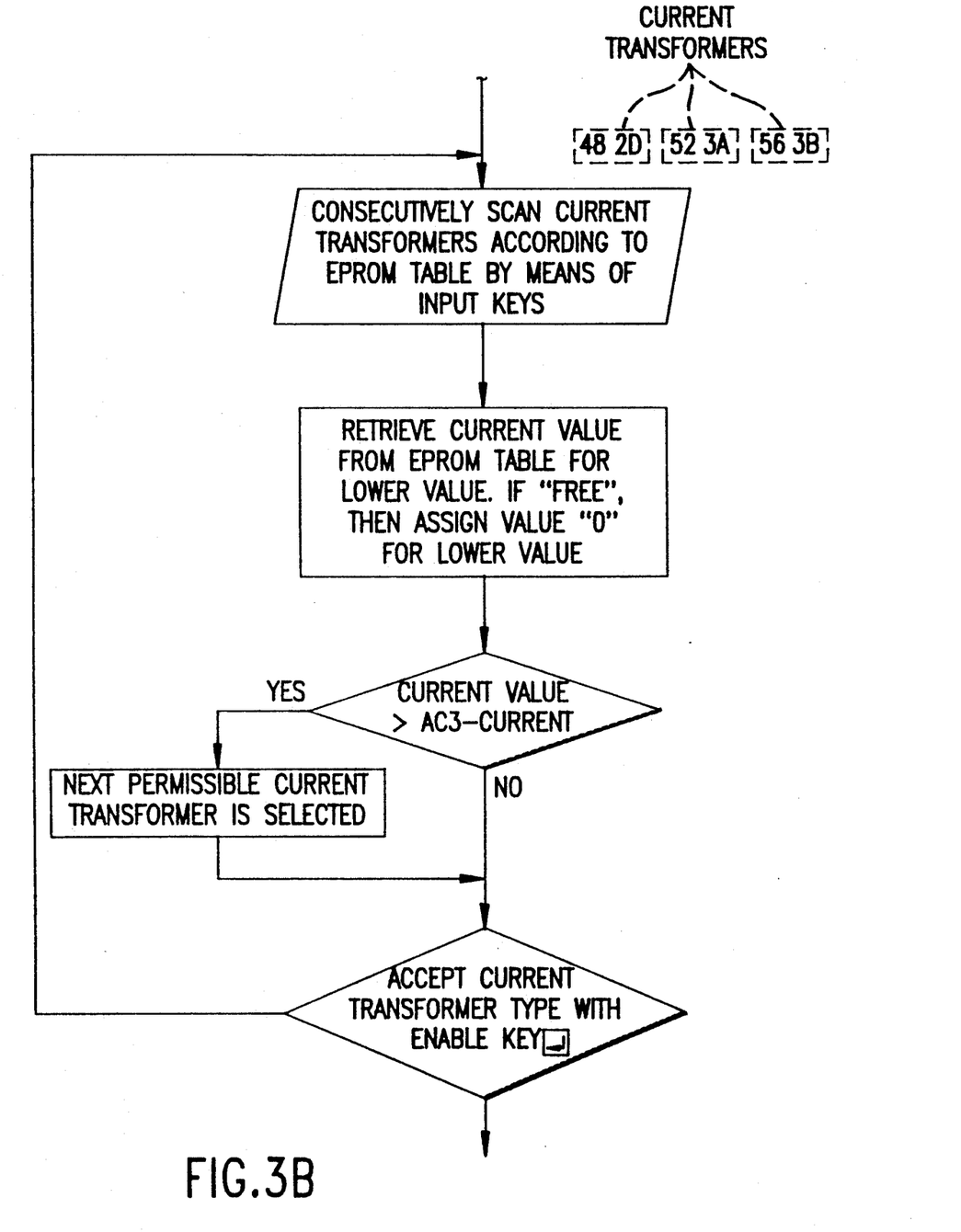
Figure 3C:
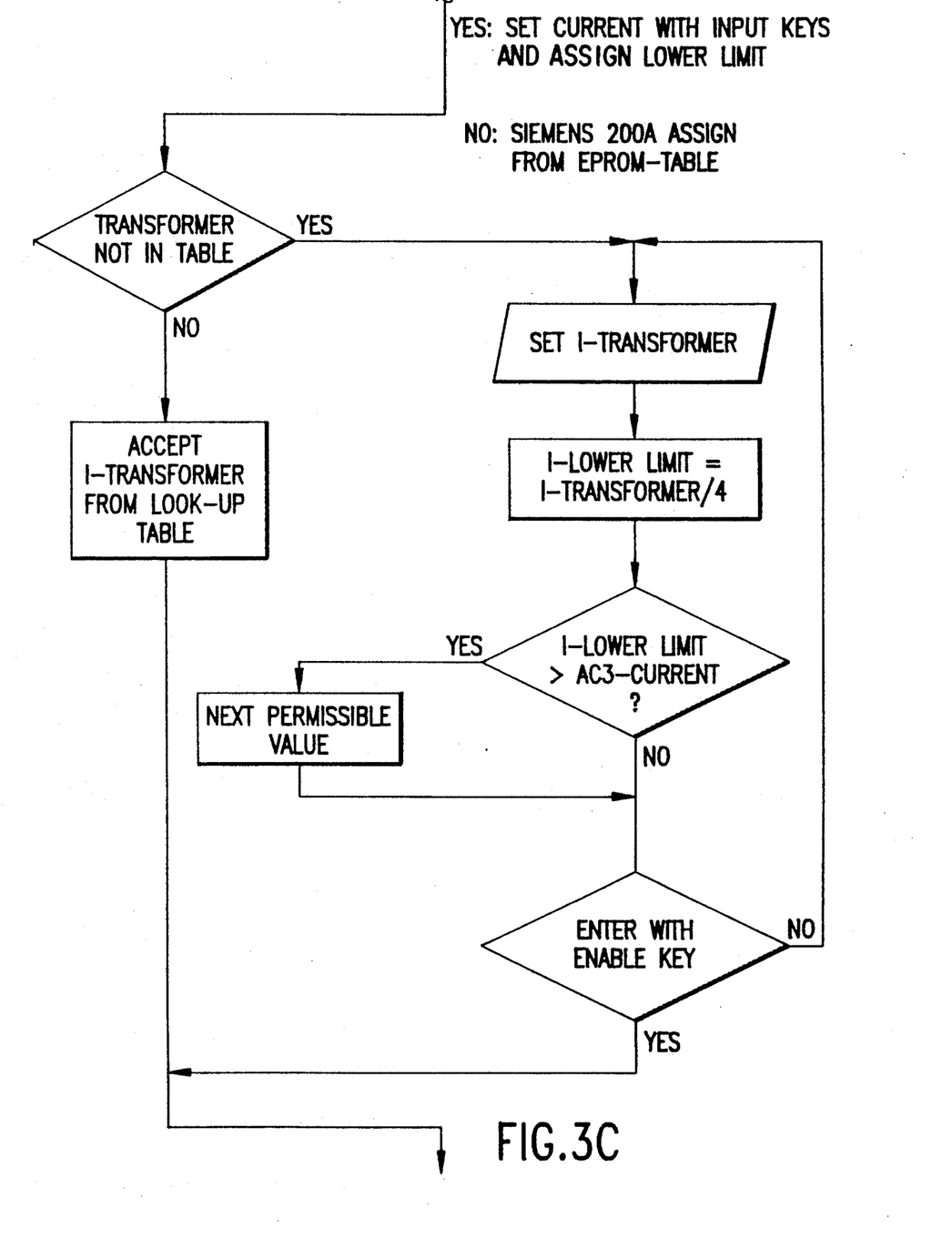
Figure 3D:
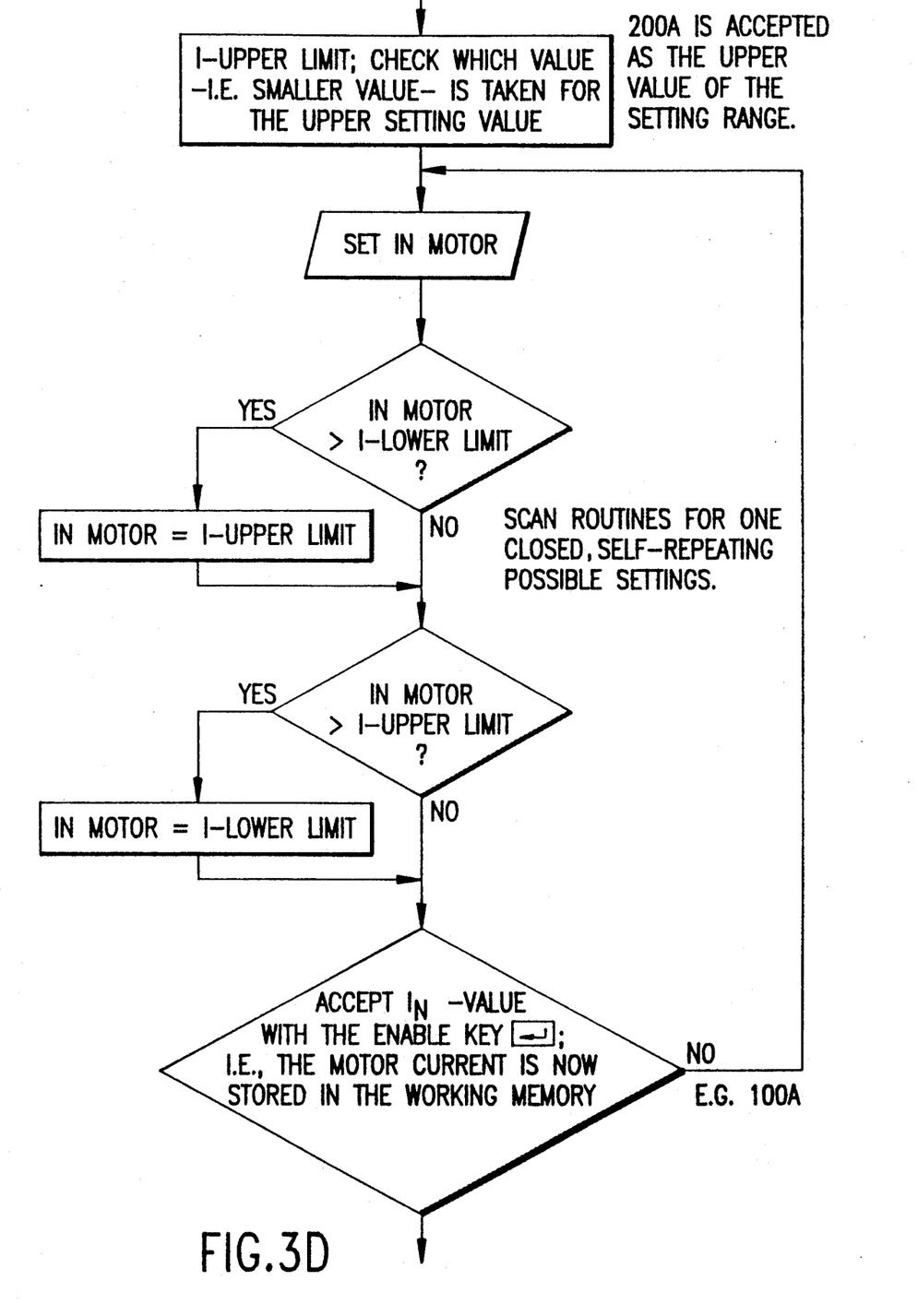
Figure 3E:
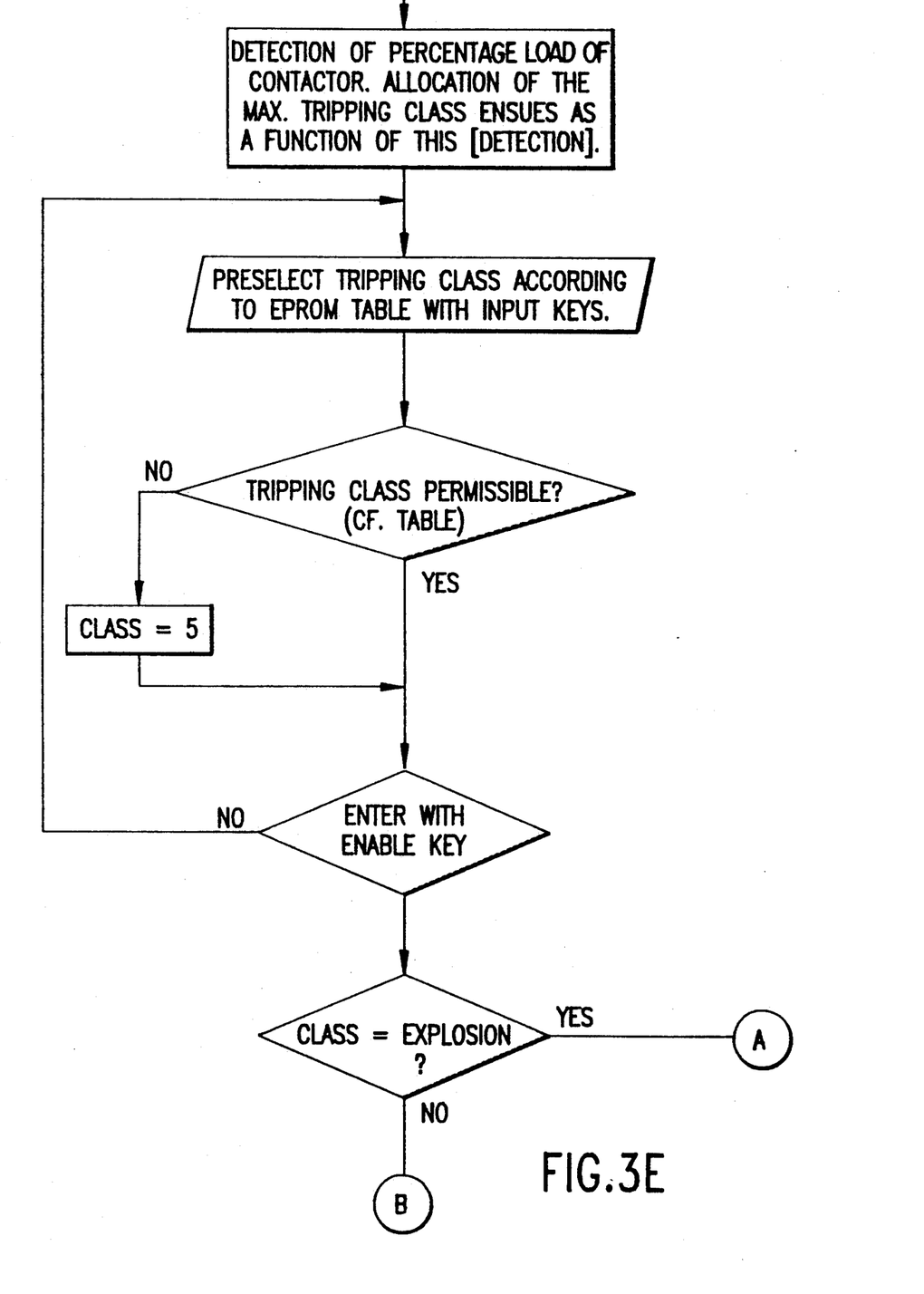
Figure 3F:
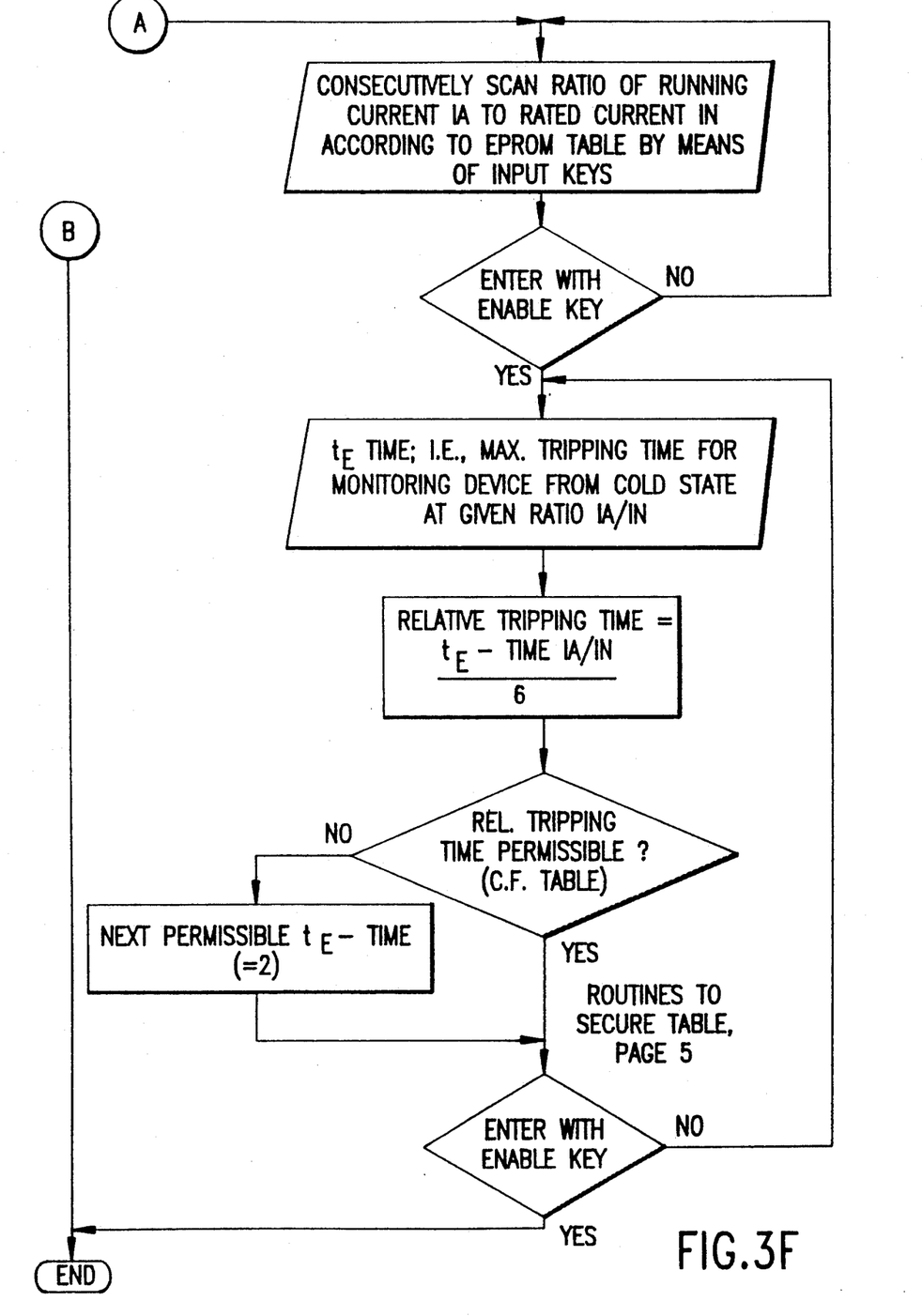

The microcontroller concatenates this data with the inputs from the user in the manner shown in the flow chart of FIGS. 3A-3F, a layout of which is shown by FIG. 3. Furthermore, a device 39 is present in the base block 1 for blocking the opening of the electric circuit through the contactor 7. This device becomes effective when currents, which have exceeded the breaking capacity of the contactors such as in the magnitude of short-circuiting currents, are measured by means of the current detecting device. To switch off the current in this case, a separate output relay, which can be an open-circuit shunt release 18 of a circuit-breaker 6, is provided to switch off the preswitched circuit breaker 6 and thus interrupt the electric circuit. In order to achieve an optimized contactor/circuit breaker breaking action, a limiting value K is set by the user. The limiting value K is for example, the ratio of the current to be interrupted to the rated motor current. If this factor K is exceeded at a breaking moment, then the breaking command is not given to the contactor, but rather to the open-circuit shunt release 18 of the circuit breaker 6. This comparative calculation can also be made via the processor of the monitoring device.

Figures 4, 4A:
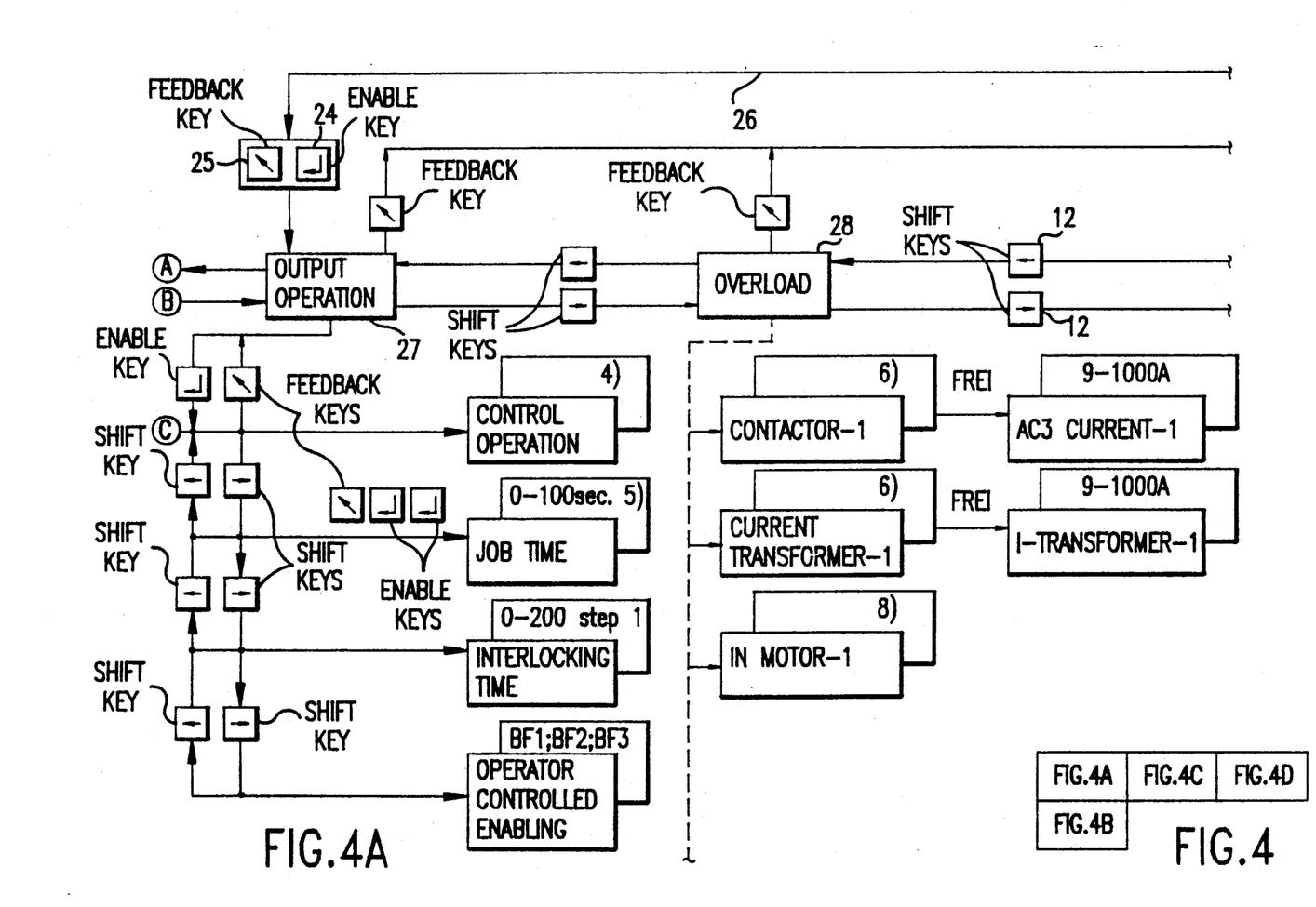
FIGS. 4 and 4A-4D is an operation tree for setting the monitoring device with the help of the display.
Figure 4B:
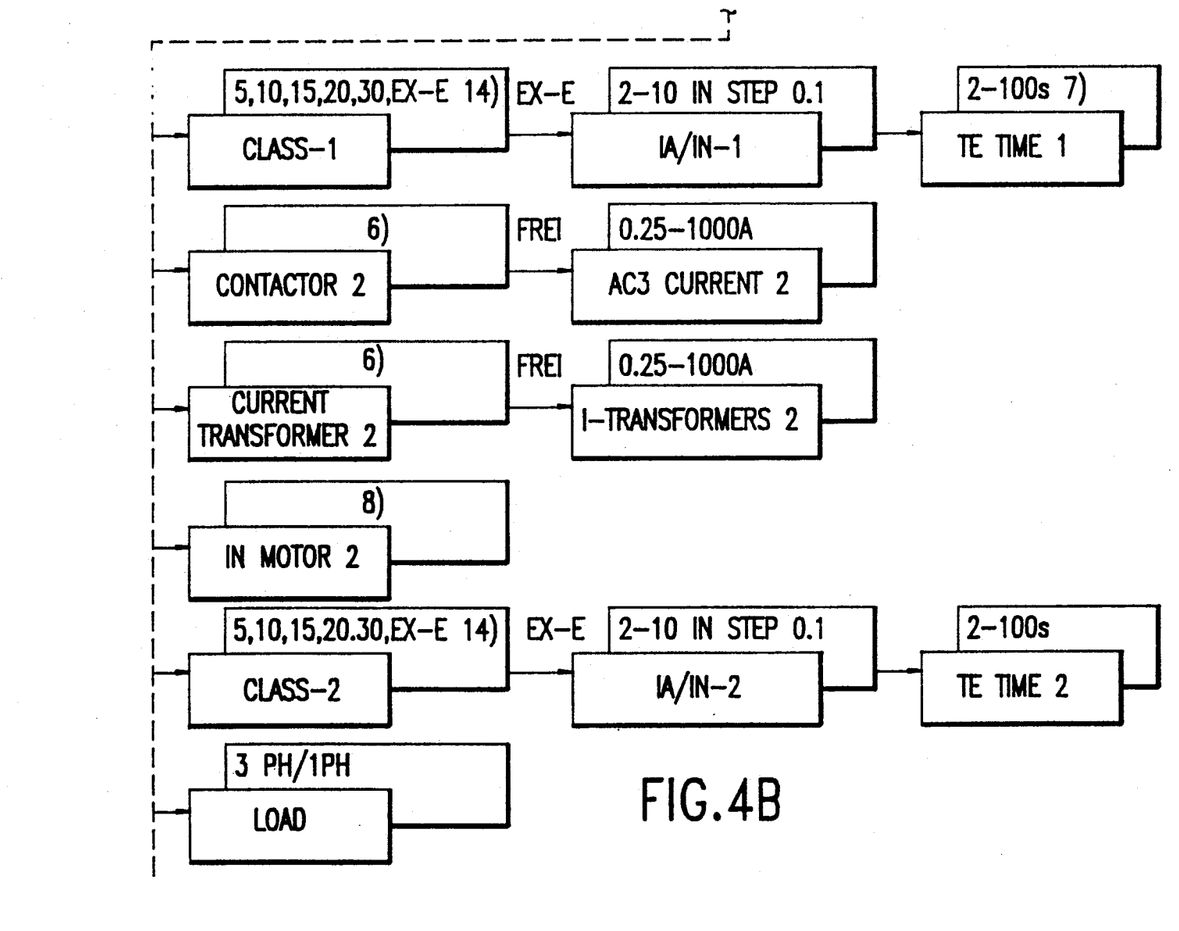
Figure 4C:
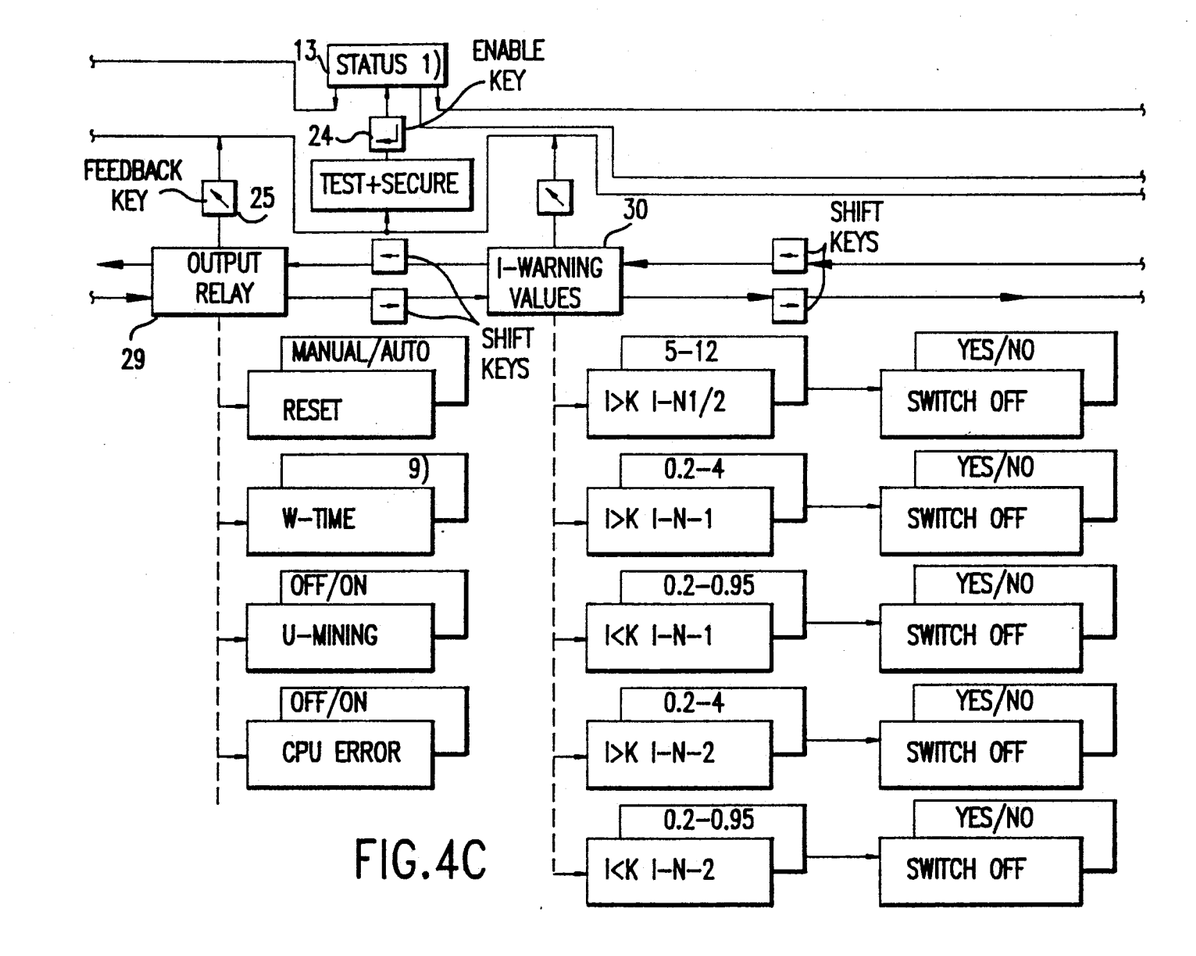
Figure 4D:
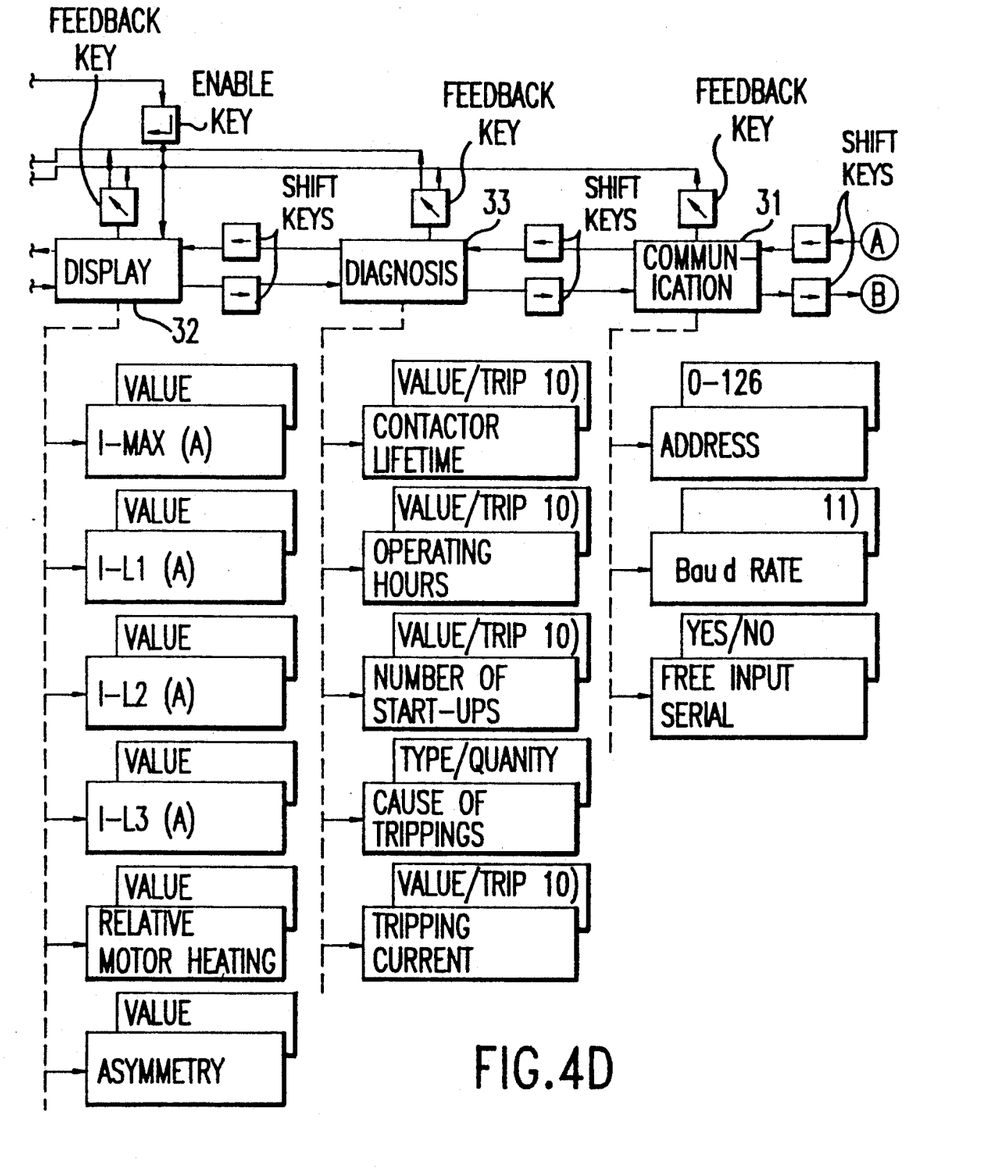

Referring to FIGS. 4A-4D, a layout of which is shown by FIG. 4., the operation tree for the monitoring device is shown. The monitoring device is set via the input keys 12, the enable keys 24 and the feedback key 25. The small boxes shown in FIG. 4 represent operational contents and the operational values offset with these operational contents. The status is generally indicated in the display indicator 13. The availability display the operation indicator, or the error display is displayed on this indicator 13. If the keys 24, 25 in the lead 26 are pressed simultaneously, then the operatational level changes to allow the selection of operations 27 to 33. The operation 27 is assigned to the block for the output operation. Operation 28 corresponds to the overload. Operation 29 is the action of the output relay. Operation 30 corresponds to the limiting current value. Operation 31 is the communication operation. Operation 32 corresponds to the display and operation 33 corresponds to the diagnosis. If in this situation, the keys 24 and 25 in the lead 26 are pressed simultaneously, then the shift keys 12 are released in the operating level. In this manner, the corresponding operation group can be selected by pressing the shift keys 12. If, for example, the enable key 24 is pressed again while the output operation 27 is operating, the operation being executed changes to the control operation. By repeatedly pressing the enable key 24, the stored control operation is retrieved. There are two possibilities to go back: either by pressing the enable key 24 or the feedback key 25. By using the enable key 24, the control operation which was just selected is accepted into the memory. The block actuating time, interlock time out, or operator controlled enabling can be accessed from the control operation box by repeatedly pressing the forward shift key 12. Corresponding transitions can be achieved in the case of the operation blocks 28 to 31. The blocks 32 and 33 merely serve the display. The display block 32 can be accessed from the status display by pressing the enable key 24. The diagnosis block can be accessed simply by using the forward shift key 12.

Providing a serially-operating interface for two-way data transmission between two locally separated units has the advantage that a separate cable does not have to be pulled from one location to the other for each signal. This also results in the advantage that several processors, which are coupled to each other by the data bus, can operate simultaneously so that the speed of the measurement and release is considerably increased. This can also be achieved when the base processor 19 is supplemented by an additional processor 20. In this case, the base processor 19 can be coupled to the processor 20 by the internal serial interface 21. Furthermore, internal serial interfaces 22, and 23 can be provided which are coupled to the operator control block 2 as well as the expansion block 3 using the plug-in connectors 9.

For example, the known bus system described in SIMATIC S5 (industrial bus system SINEC L 1) Issue 1986, has proved successful as a bus system.

The processors 19, and 20 can exchange data between themselves. The type of data transmission can include data relating to the various priorities. The consideration of different priority levels within the transferred data is solved by providing different transmit rates of occurrence. The prerequisite for this is that the data can be transmitted and received in appropriate groupings. Serial data transmission between two processsors usually takes place according to a so-called "handshake" process. In this manner, the processor, which has just received the data, informs the transmitter via a control line that the transmitted data has arrived. The same is true for the reverse data transmission direction. Transmitted and received data run in an uncoordinated and irregular manner with respect to time. Thus, the requisite time frame for grouping/ranking data according to priority is not possible. A second possibility for creating a framework is to use start and stop symbols. In order to make these symbols unequivocal, they must be excluded as transmitted data. For this purpose, an encoding of the transmitted data is necessary. This results in an increase of the gross data and a higher processing time in both processors.

Figure 5:
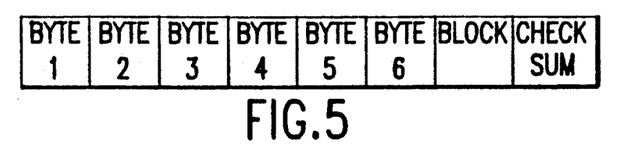
FIG. 5 is the block structure for transmitting data blocks.
Figure 6:
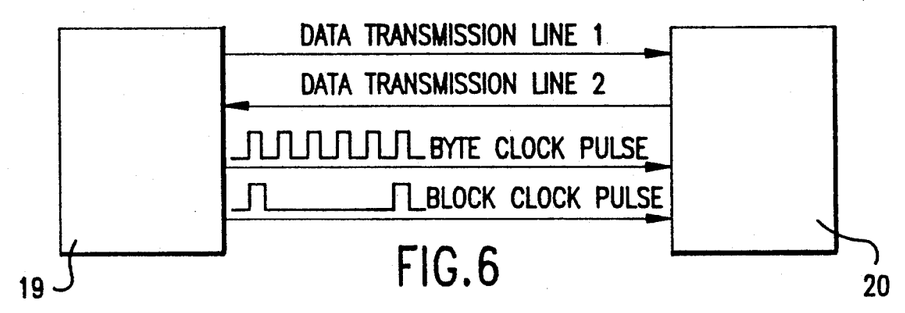
FIG. 6 is the block control between a base processor and an additional processor.

The method of the present invention creates a timing framework for the transmission of data blocks. Referring to FIG. 5, the data blocks are formed by several bytes. The second to last byte carries the block number. The last byte carries the check-sum to insure the correctness of the data. Transmitted and received blocks have the same length. While transmitting a byte, the base processor 19 forms the byte clock pulse for the additional processor 20. When the end-of-block code is reached, it generates the end-of-block clock pulse for the additional processor 20 (FIG. 6). An interval in the byte clock pulse follows before and during each end-of-block clock pulse. In this manner, the block synchronism is guaranteed. During this interval, the received data is checked and processed.

Figure 7:
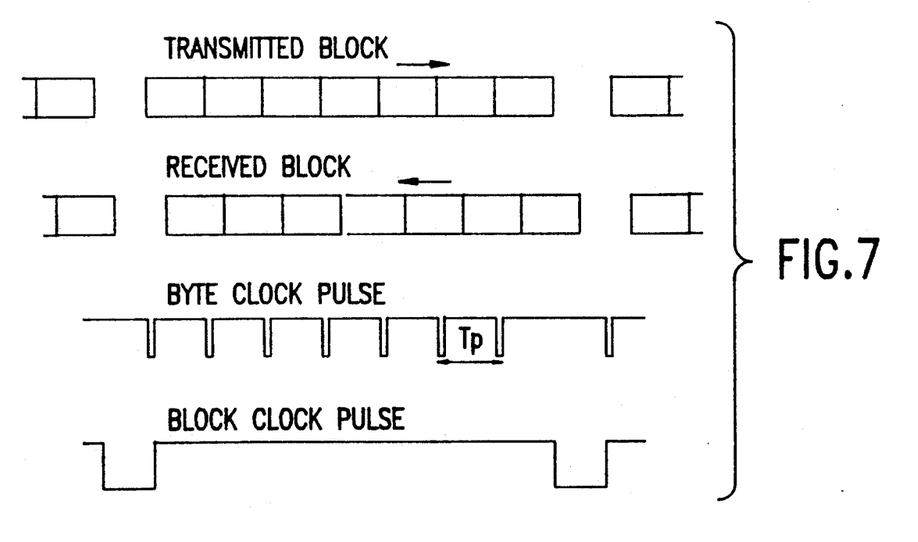
FIG. 7 is a timing diagram of the block control of FIG. 7.
Figure 8:
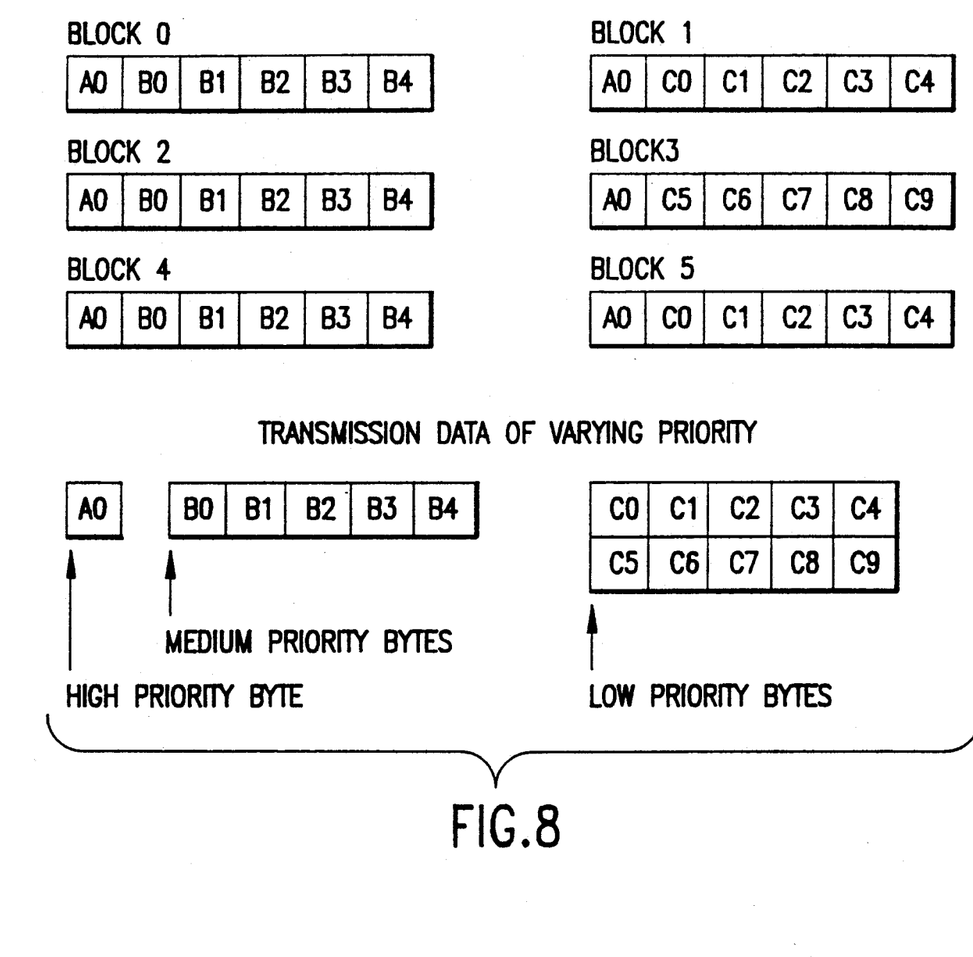
FIG. 8 is the block configuration and transmission sequence for the monitoring device.

The byte clock pulse is selected so that it is guaranteed that the base processor 19 can transmit and receive one byte during one clock pulse cycle Tp (FIG. 7) under all conceivable operating conditions. The priority-oriented transmission of data is possible with this block formation. Referring to FIG. 8 this scheme for the transmission of data is shown. Only the block length is common to the transmit and receive directions. The block configuration and block sequencing are arbitrarily selectable. The transmission is full duplex (FIG. 6). The data signalling rate is oriented to the maximum possible byte clock pulse.

The data buffer which is required for receiving data corresponds to one data block. The block size is selected so that the priority requirements are fulfilled in the case of a minimum data memory (e.g. buffer memory).

The monitoring device of the present invention is, an intelligent field device which includes optimally adaptable, motor protection switch (having changeable operating parameters), motor current indicator, and diagnostic operations. A multitude of data is made available from the computer to control these operations. The standardized communication interface lowers hard wiring and energy costs and makes possible an easy, flexible installation and maintenance of the branch circuit. Also, the standardized communication interface aids the sharing of preexisting operator control stations and monitoring devices. The monitoring device of to the present invention can also work together with primary programmable controllers.

We claim:

1. A monitoring system comprising:
    a monitoring device comprising:
        a switching mechanism to open or close electric circuits to turn the circuits on or off;
        a current detecting device providing inputs to cause operation of said switching mechanism in case of overload;
        a processor and setpoint memories coupled to said current detecting device which compare and evaluate actual values, said processor and setpoint memories being capable of detecting and accruing additional operational error data and statistical operating data over a time of a least two on cycles, said processor and setpoint memories choosing maintenance instructions based on said operational error data and statistical operating data;
        a tripping state indicating device; and
        a run display to display said data; and
    a bus coupled to said processor and setpoint memories of said monitoring device via one or more serially operating interfaces, said bus providing two-way data transmission between said monitoring device and other separate devices coupled to said bus, wherein said monitoring device is capable of performing output operations and assigning said various output operations to a respective setpoint selection; and
    a plurality of input keys, such that desired operating parameters are capable of being entered into said monitoring system via input keys, said desired operating parameters capable of being displayed at said run display.

2. The monitoring device of claim 1, further comprising:
    a blocking device capable of blocking the enabling of said switching mechanism in dependence on an impermissible specification of at least one of a load capacitance of a current transformer, contactor size, rated current and tripping class.

3. The monitoring device of claim 2, wherein said blocking device is capable of providing explosion protection in dependence on specifications for explosion protection.

4. The monitoring device of claim 1 further comprising:
    a primary circuit breaker;
    a device to block and to open the electric circuit by means of said primary circuit breaker.

5. The monitoring device of claim 1, wherein said monitoring device is capable of performing at least one of an instant startup operation, a reverse startup operation, a star-delta startup operation, a Dahlander startup operation, a pole reversal operation, a valve actuation operation, a shift operation, a soft start operation and a control operation of latched switching devices.

6. The monitoring device of claim 1 further comprising:
    one or more serially operating interfaces for two-way data transmission between said monitoring device and a separate unit.

7. The monitoring device of claim 6, wherein said monitoring device and said separate unit are locally separated.

8. The monitoring device of claim 7, wherein a release of a input key operation takes place as a function of the interface terminal for the locally separated units.

9. The monitoring device of claim 8 wherein said input keys comprise one enabling key, two shift keys and one feedback key capable of operating according to a default menu.

10. The monitoring device of claims 8, wherein the interface for the locally separated unit is functionally coupled to the input keys.

11. The monitoring device of claim 6, wherein said monitoring device and said separate unit comprise separate processors.

12. The monitoring device of claim 11, wherein the control of the data transmission takes place through the base processor and wherein the base processor emits a byte clock pulse and a block clock pulse to the additional processor.

13. The monitoring device of claim 6, wherein transmitted and received data of the two-way data transmission is arranged into several data blocks, and the transmission sequence of the individual data blocks takes place according to the required timing priority.

14. The monitoring device of claims 1 and further including a separate operator control block coupled to said monitoring device via plug-in connectors.

15. The monitoring device of claim 14, wherein the operator control block has light-emitting diodes as operational status indicators.

16. The monitoring device of claim 14, wherein the operator control block has control keys which are assigned to output operations according to replaceable labels.

17. The monitoring device of claim 1, further comprising:
    an enable input for detecting operational errors.

* * * * *